United States Patent
Anderson

(10) Patent No.: US 6,512,548 B1
(45) Date of Patent: *Jan. 28, 2003

(54) METHOD AND APPARATUS FOR PROVIDING LIVE VIEW AND INSTANT REVIEW IN AN IMAGE CAPTURE DEVICE

(75) Inventor: Eric C. Anderson, San Jose, CA (US)

(73) Assignee: FlashPoint Technology Inc., Peterborough, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/584,657

(22) Filed: May 30, 2000

Related U.S. Application Data

(63) Continuation of application No. 08/890,896, filed on Jul. 10, 1997, now Pat. No. 6,137,534.

(51) Int. Cl.⁷ .......................... H04N 5/222; H04N 9/04
(52) U.S. Cl. .......................... 348/333.05; 348/333.11; 348/207
(58) Field of Search .................. 348/222, 231, 348/232, 233, 376, 207, 333.01, 333.02, 333.04, 333.05, 333.11, 333.12; 358/906, 909.1

(56) References Cited

U.S. PATENT DOCUMENTS

| | | | |
|---|---|---|---|
| 4,827,347 A | * 5/1989 | Bell | 348/333.05 |
| 5,043,816 A | * 8/1991 | Nakano et al. | 348/231 |
| 5,070,406 A | * 12/1991 | Kinoshita | 348/222 |
| 5,164,831 A | * 11/1992 | Kuchta et al. | 348/233 |
| 5,724,579 A | * 3/1998 | Suzuki | 358/403 |
| 5,815,201 A | * 9/1998 | Hashimoto et al. | 348/232 |
| 5,845,166 A | * 12/1998 | Fellegara et al. | 348/64 |
| 5,949,950 A | * 9/1999 | Kubo | 348/207 |
| 6,137,534 A | * 10/2000 | Anderson | 348/222 |

\* cited by examiner

*Primary Examiner*—Aung S. Moe
(74) *Attorney, Agent, or Firm*—Sawyer Law Group LLP

(57) ABSTRACT

A method and system for providing instant review of a last image in an image capture device is disclosed. The image capture device includes a viewfinder for displaying a live image and each image of a plurality of previously captured images. The method and system include selecting instant review of the last image captured by the image capture device, determining the status and location of the last image, and providing the last image to the viewfinder for display. Therefore, the image capture device is capable of displaying the last image substantially immediately after the last image has been captured. In another aspect, the image capture device contains an image processing system. In this aspect, the method and system include allowing a user to access a play mode and a review mode while the last image captured undergoes processing by the image processing system.

31 Claims, 10 Drawing Sheets

METHOD AND APPARATUS FOR PROVIDING LIVE VIEW AND INSTANT REVIEW IN AN IMAGE CAPTURE DEVICE

This is a continuation of application Ser. No. 08/890,896, filed Jul. 10, 1997, now U.S. Pat. No. 6,137,534.

FIELD OF THE INVENTION

The present invention relates generally to digital cameras, and more particularly to a method and apparatus for providing an instant review mode in digital cameras.

BACKGROUND OF THE INVENTION

Most digital cameras today are similar in size to and behave like conventional point-and-shoot cameras. However, most digital cameras store digital images in an internal flash memory or on external memory cards and are equipped with a liquid-crystal display (LCD) screen on the back of the camera. Through the use of the LCD, most digital cameras operate in two modes, live and play. In live mode, the LCD is used as a viewfinder in which the user may view an object or scene before taking a picture. In play mode, the LCD is used as a playback screen for allowing the user to review previously captured images either individually or in arrays of four, nine, or sixteen images.

When a user wishes to capture an image in live mode, the user sends a capture command, usually by pressing a capture or shutter button. When the image is captured, the image is frozen on the LCD for a relatively long time while the image is processed and stored in memory. Typically, the image is partially obscured by a "waif" message during processing. Once the camera has finished processing and storing the image, the camera reverts back to the live mode for capturing further images. If the user desires to view the image just captured, the user must change to play mode.

Although a user can capture images in live mode, a user cannot obtain an unobstructed view an image that has just been captured without changing from live mode to play mode. The user also lacks control over the image frozen on the LCD during processing. Similarly, there is no control over the mode which the camera returns to after processing. Instead, the camera automatically returns to a live view, forcing the user to switch to play mode to view or perform operations on the last image captured.

Accordingly, what is needed is an improved method and system for accessing the last image captured by a digital camera. The present invention addresses such a need.

SUMMARY OF THE INVENTION

The present invention provides a method and system for providing instant review of a last image captured in an image capture device. The image capture device includes a viewfinder for displaying a live image and each image of a plurality of previously captured images. The method and system comprise allowing a user to select instant review of the last image captured by the digital camera. The method and system further comprise determining the status and location of the last image and providing the last image to the viewfinder for display. Therefore, the image capture device is capable of displaying the last image substantially immediately after the last image has been captured. In another aspect, the image capture device contains an image processing system. In this aspect, the method and system comprise allowing a user to access a play mode and a review mode while the last image captured undergoes processing by the image processing system.

According to the system and method disclosed herein, the present invention allows a user to view and perform operations on an image very shortly after the image is captured, thereby increasing overall system performance.

DETAILED DESCRIPTION OF THE INVENTION

Figure 1:
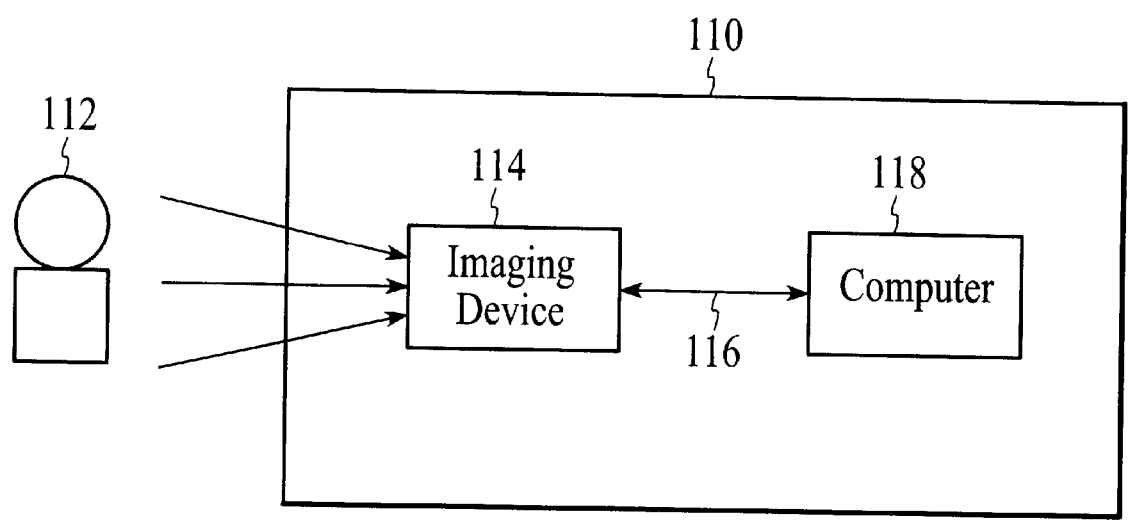
FIG. 1 is a block diagram of a digital camera that operates in accordance with the present invention.

The present invention relates to an improvement in digital cameras. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Many conventional digital cameras have two modes: live mode and play mode. In live mode, images are actually captured and the liquid-crystal display (LCD) screen is used as a viewfinder. In play mode, the LCD screen on the back of the camera can display previously captured images.

In order to switch between modes and control the digital camera in a given mode, a user interface is typically employed. The user interface typically includes a number of buttons or switches for setting the camera into one of the two modes and for navigating between images in play mode. For example, a digital camera may include two navigation buttons labeled "−" and "+", a mode button, a display button, a zoom button, a delete button, and a capture or shutter button.

In play mode, the digital camera may begin with a default screen displaying a full-sized individual image that was previously captured. Other images stored in the camera may be displayed in a backward or forward sequence by pressing the "−" and "+" navigation buttons, respectively. During play mode, the user can also cause four images to be displayed in a 2×2 array, nine images to be displayed in a 3×3 array, or sixteen images to be displayed in a 4×4 array.

The user can then "page" through screens of image arrays or move from image to image in the arrays. The user may also have the full-sized image displayed of a chosen image and can delete the image.

One disadvantage of conventional digital cameras is that when a user wishes to capture an image, the user must first switch from play mode to live mode. In live mode, the LCD acts as a viewfinder. The user captures the image by pressing the capture or shutter button, which typically controls the shutter. The image is then frozen on the LCD while the image is processed and stored in memory. Processing generally includes compression of the image prior to storage in memory. Therefore, the image is typically frozen on the LCD screen for a relatively long time, often up to a few seconds. The image frozen on the LCD screen is also partially obscured by a "wait" message during processing. In addition, the image displayed on the screen during processing may actually be the image just prior to the image being processed.

Once the camera has finished processing the image, the camera automatically removes the frozen image and reverts back to the live mode for capturing further images. If the user desires to view the image just captured, the user must change from live mode to play mode. Only then can the user view the last images, as well as all previously captured images. Once in play mode, the user can also perform operations on the image, such as deleting the image.

Although a digital camera allows a user to review previously captured images and capture new images, one of ordinary skill in the art will readily recognize that a user cannot obtain an unobstructed view of an image that has just been captured in live mode. Although an image is frozen on the screen after capture, the image is partially obscured by the "wait" message. If a user desires an unobstructed view or to perform operations on the last image captured, the user must switch to play mode. There is no control over the image frozen on the LCD during processing. One of ordinary skill in the art will also realize that the user is unable to control the mode to which the camera returns to after processing. Instead, the camera automatically returns to a live view.

The present invention provides a method and system for providing an instant review mode which allows instant review of the last image captured in a digital camera. Thus, although the present invention will be described in terms of instant review of an image, the method and system provide rapid review of the image. Although the present invention will be described in terms of a digital camera having at least two modes, live view and instant review, one of ordinary skill in the art will realize that the present invention is not limited to a digital camera having two modes. In a one embodiment, the digital camera employing the method and system supports additional modes such as review mode and play mode, described below. Finally, although the present invention is described in terms of a digital camera, one of ordinary skill in the art will readily realize that the method and system are fully applicable to any image capture device.

Referring now to FIG. 1, a block diagram of a digital camera 110 is shown for use in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
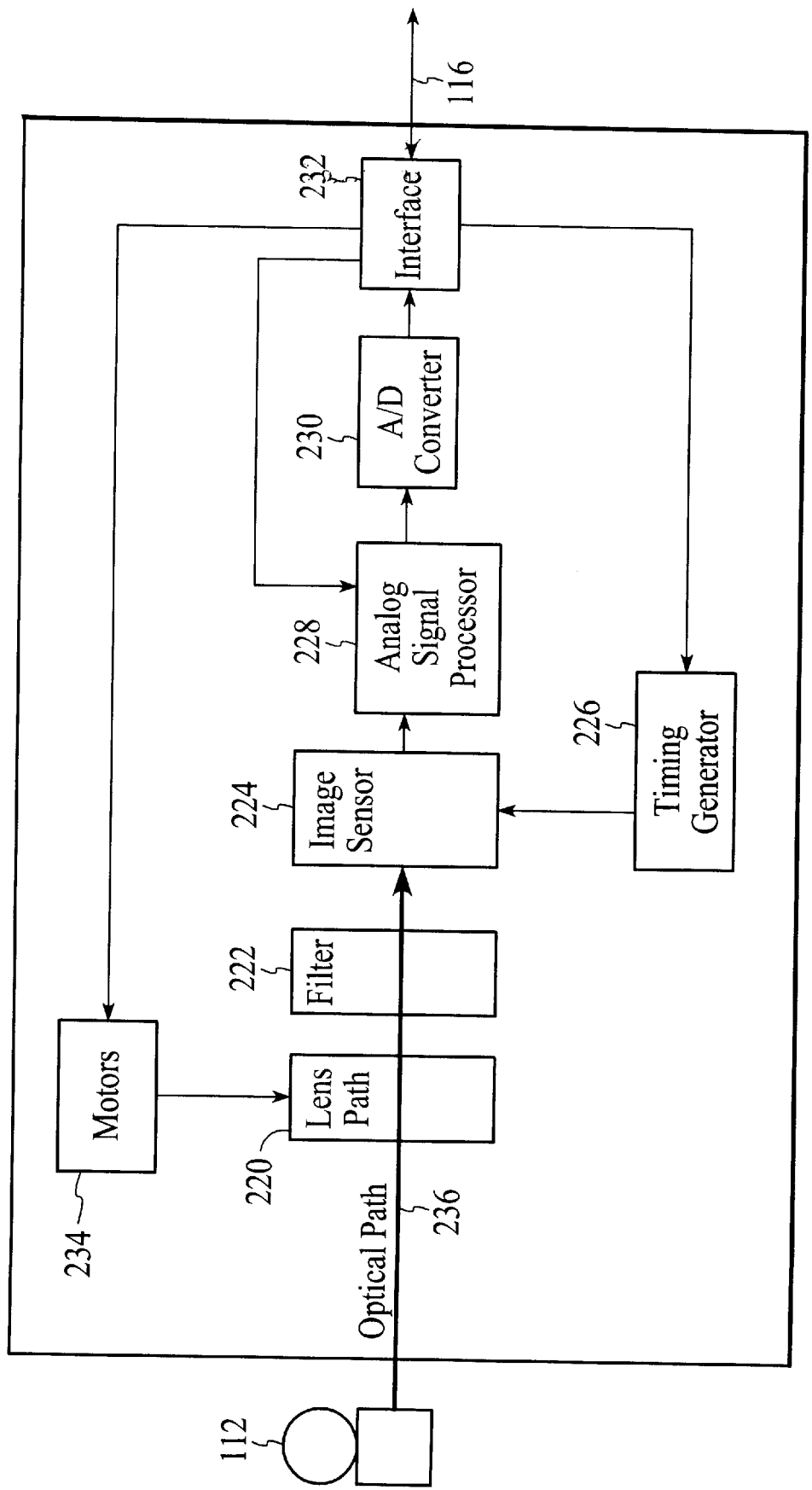
FIG. 2 is a block diagram of one embodiment for the imaging device of FIG. 1.

Referring now to FIG. 2, a block diagram of one embodiment of imaging device 114 is shown. Imaging device 114 typically comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
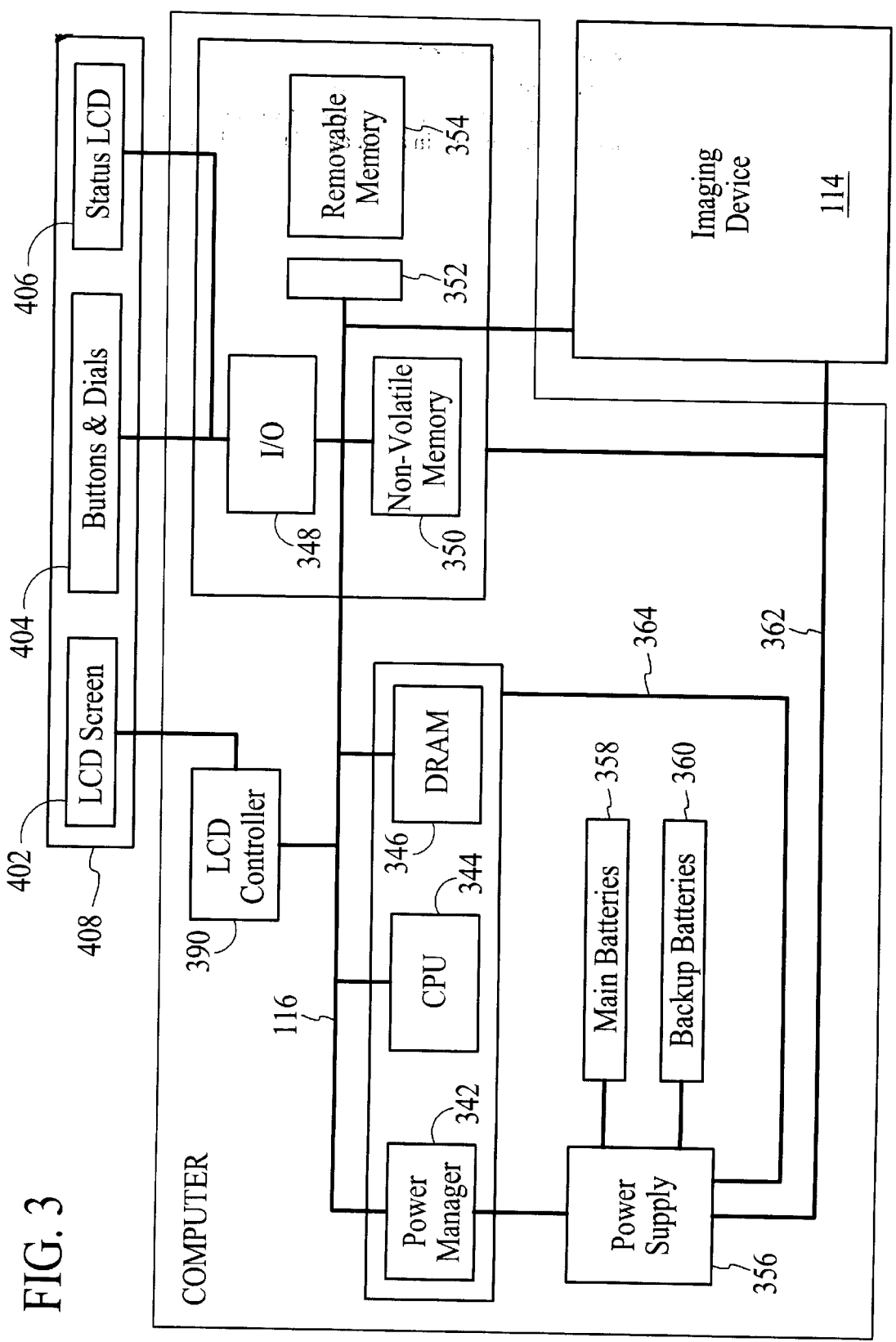
FIG. 3 is a block diagram of one embodiment for the computer of FIG. 1.

Referring now to FIG. 3, a block diagram of one embodiment for computer 118 is shown. System bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multithreaded environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk. Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 4A:
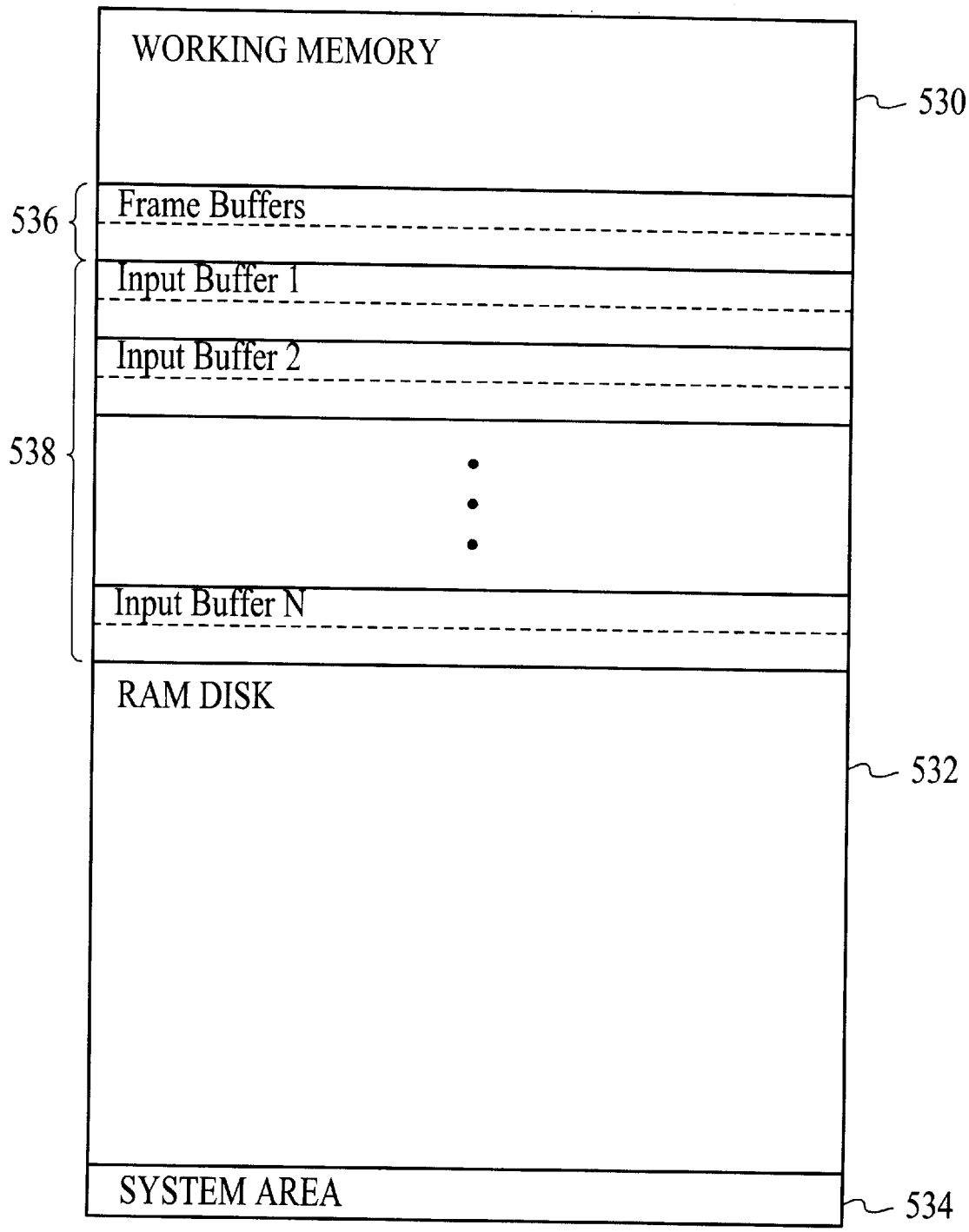
FIG. 4A is a memory map showing one embodiment of the Dynamic Random-Access-Memory (DRAM).

Referring now to FIG. 4A, a memory map showing one embodiment of dynamic random-access-memory (DRAM) 346 is shown. In the preferred embodiment, DRAM 346 includes RAM disk 532, a system area 534, and working memory 530.

RAM disk 532 is a memory area used for storing raw and compressed image data and typically is organized in a sectored format similar to that of conventional hard disk drives. In the preferred embodiment, RAM disk 532 uses a well-known and standardized file system to permit external host computer systems, via I/O 348, to readily recognize and access the data stored on RAM disk 532. System area 534 typically stores data regarding system errors (for example, why a system shutdown occurred) for use by CPU 344 upon a restart of computer 118.

Figure 4B:
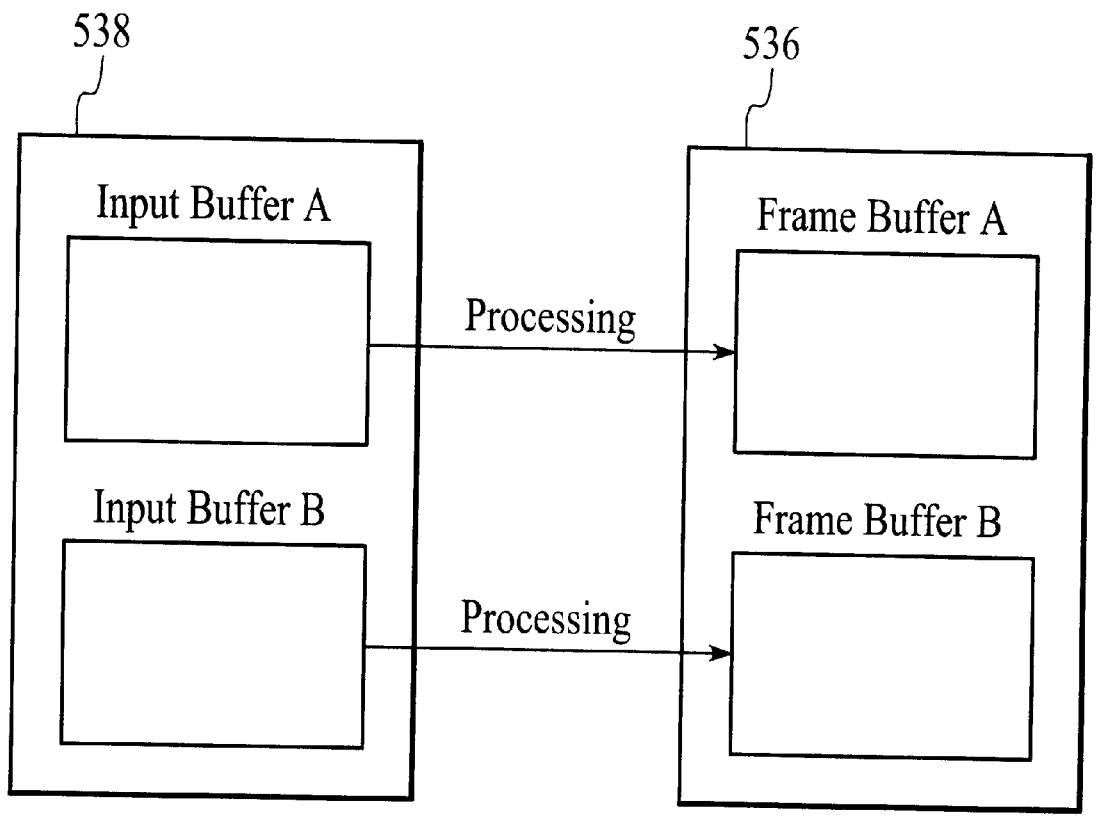
FIG. 4B is a block diagram illustrating the contents of one of the input buffers and the contents of the frame buffer.

Working memory 530 includes various stacks, data structures and variables used by CPU 344 while executing the software routines used within computer 118. Working memory 530 also includes several input buffers 538 for temporarily storing sets of raw image data received from imaging device 114, and a frame buffer 536 for storing data for display on the LCD screen 402. In a preferred embodiment, each input buffer 538 and the frame buffer 536 are split into two separate buffers, called ping-pong buffers (shown by the dashed lines), to improve the display speed of the digital camera and to prevent the tearing of the image in the display 402. Referring now to FIG. 4B, the contents of one of the input buffers 538 and the contents of the frame buffer 536 are illustrated. As shown, each input buffer 538 includes an input buffer A and an input buffer B, and the frame buffer 536 includes a frame buffer A and a frame buffer B. The input buffers A and B alternate between an input cycle and a processing cycle. During the input cycle, the input buffers 538 are filled with raw image data from the image device 114, and during the processing cycle, CPU 344 processes the raw data and transmits the processed data to the frame buffers 536.

Figure 5:
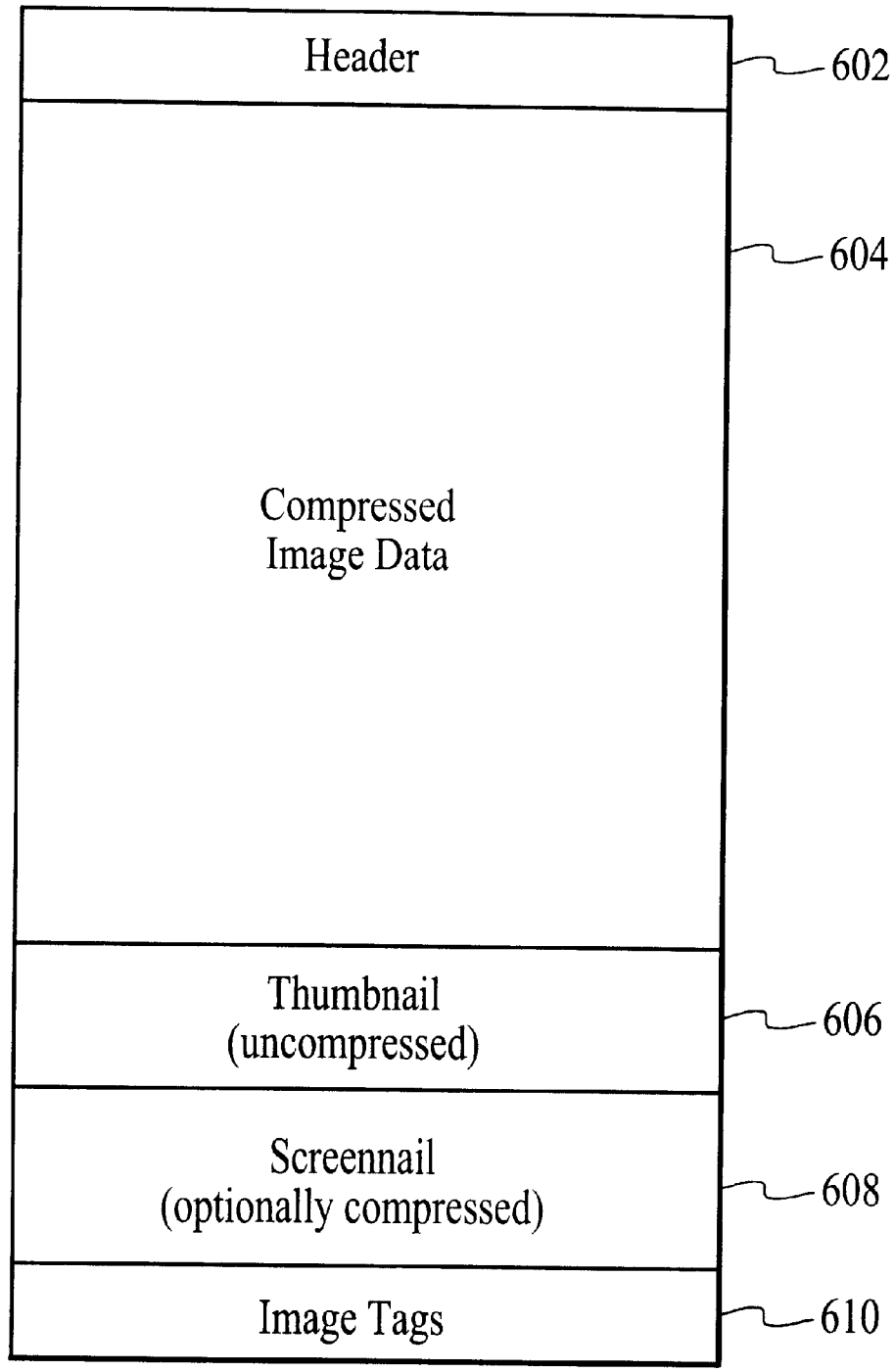
FIG. 5 is a block diagram illustrating an enhanced format of still image file in accordance with the present invention.

Referring now to FIG. 5, a block diagram of an enhanced format of still image file in accordance with the present invention is shown. The image file 600 includes a header 602, compressed image data 604, a thumbnail image 606, a screennail 608, and an image tag field 610. The image file 600 may also include a sound file (not shown) if a sound clip has been attached to the particular image.

The header 602 includes information identifying the particular image file and the image represented by the image data 604. The image data 604 is the actual data comprising the full-sized captured image in compressed form, preferably in JPEG format. Although the user can typically choose the resolution mode in which images are captured, once an image is processed and compressed, the compressed image data 604 is the high-resolution representation of the image compared to the thumbnail 606 and screennail 608. If the image is captured at a resolution of 640×480 pixels, for example, then the compressed image data 604 is typically fifty-to-sixty kilobytes in size.

The thumbnail image 606 is a small, uncompressed low-resolution version of the image. In a preferred embodiment, the pixel size of thumbnail image 606 is less than the display size of the LCD screen 402 (e.g., 80×60 pixels), and has a storage size of approximately ten kilobytes.

The screennail image 608 is a medium-resolution version of the image and in a preferred embodiment is also compressed, although compressing the screennail 608 is optional. Unlike the thumbnail image 606, the screennail image 608 is display-sized and fills the visible area of the LCD screen 402 when displayed. In one embodiment, the screennail image 608 is optional. The screennail image 608 may be optional because the image sensor 224 is small enough, for example 640×480 pixels in size, that the image data 602 can be very rapidly provided to the LCD screen 402. Similarly, the screennail image 608 may be optional where the hardware for the camera 110 is capable of providing the image data 604 rapidly enough. In one embodiment in which the screennail image 608 is optional, the data for the screennail image 608 remains in memory available for display until the image file 600 is completed. In a preferred embodiment, the pixel size of a compressed screennail image 608 is preferably 288×216 and requires approximately fifteen kilobytes to store.

The image tag field 610 includes information, preferably in the form of tags, regarding the image represented by the image data 604. Media type tags, for instance, indicate all the media types associated with the image, such as whether the image is a single image or a panorama image, for example. In certain operating modes, the media type tags are used to select the type of icon that is displayed in the LCD 402 along side the thumbnail image 606. Besides media tags, the image tag field 610 may also include other types of tags for storing additional information regarding the image and/or the camera 110 itself. For example, a tag could be used to indicate the settings of the camera 110 at the time the image was captured, or indicate the identity of the camera manufacturer, for instance. The information in these tags may be accessed through the buttons on the camera interface 400. The additional information may then be displayed either as text in the LCD 402.

The enhanced image file 600 of the present invention is created for each image as the user takes pictures while the camera is in capture mode. The enhanced image file 600 is then used to accelerate the user interface of the digital camera in the review and play mode as follows. When the camera is placed into review mode, the thumbnail images 606 contained in the image files 600 are directly displayed on the LCD 402 as representations of captured images, which eliminates the need to process and decompress the compressed image data 604. And when the camera is placed into play mode, the screennail image 608 contained in the image file 600 is first decompressed and displayed on the LCD 402 and then optionally updated with the higher-resolution compressed. image data 604 as the image data 604 is being decompressed. This feature enables the digital camera to quickly display a full-sized version of the captured image in the LCD 402 without the delay incurred by first decompressing the higher-resolution JPEG image and resizing it to fit on the LCD 402. Whether or not to decompress and display the compressed image data 604 depends on the resolution of the display and the resolution of the screennail images 608.

Figure 6:
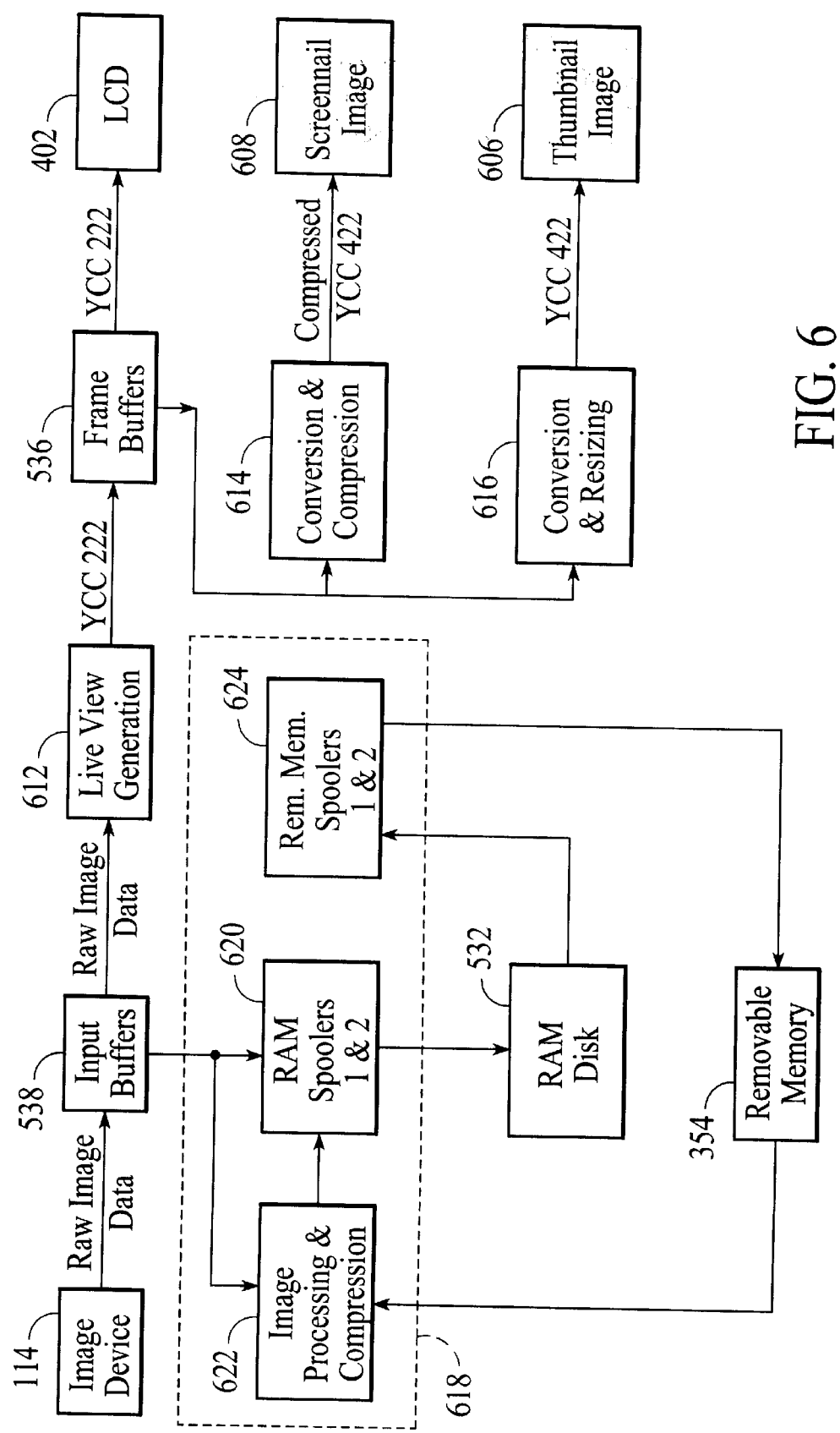
FIG. 6 is a block diagram illustrating the image file generation process, which begins when the camera is in capture mode and the user presses the shutter button to capture an image.

Referring now to FIG. 6, a block diagram is shown of the image file generation process, which begins when the camera is in capture mode and the user presses the shutter button 418 to capture an image. As described above, before the user captures an image in capture mode, frames of raw image data are sequentially captured by the imaging device 114 at a reduced resolution suitable for LCD screen 402, and each of the frame of the raw image data are stored in the ping-pong buffers (FIG. 4B) of an input buffer 538. The live view generation process 612 performs gamma correction and color conversion on the raw image data to convert the data into the YCC format of the LCD screen 402, typically YCC 222 format, and then transfers the YCC 222 data for each frame to the frame buffers 536 for display. The raw image data placed into the input buffers 538 is also processed for extracting exposure, focus, and white balance settings.

Once the user presses the shutter button 418 to capture an image, the raw image data is captured by the image device 114 at a resolution set by the user and the raw image data is stored into an appropriate number of input buffers 538.

The raw image data is then used to generate an enhanced image file 600 for the captured image including the compressed image data 604, the thumbnail 606, and the screennail 608, as shown in FIG. 5.

When generating the thumbnail and screennail images 606 and 608, the present invention takes advantage of the fact that the YCC data in the frame buffers 536 has already been processed by the live view generation process 612 and stored at the reduced resolution of the LCD screen 402. Since the thumbnail and screennail images 606 and 608 are also intended to be lower-resolution representations of the captured image, the previously processed YCC data in the frame buffers 536 is used to generate the thumbnail 606 and screennail 608 directly, rather than using the raw image data stored in the input buffers 538.

To generate the screennail image 608, the YCC data in the frame buffers 536 is converted from YCC 222 format into YCC 422 format and compressed by a conversion and compression process 614. To generate the thumbnail image 606, the YCC data in the frame buffers 536 is converted from the YCC 222 format into YCC 422 format and then resized by a conversion and resizing process 616. During the conversion and resizing process 616, the thumbnail image 606 may be resized by averaging in which a block of pixel values from the YCC 422 data are averaged to represent one pixel value of the thumbnail image 606, and/or by sub-sampling the YCC 422 data in which only a certain number pixels in a block are used to represent one pixel in the thumbnail image 606.

Referring now to FIGS. 4A, 5 and 6, after the thumbnail image 606 and the screennail 608 are generated, they are stored in working memory 530 until the compressed image data 604 is generated. The compressed image data 604 may be generated either before or after the thumbnail and screennail images 606 and 608. However, in a preferred embodiment, the compressed image data 604 is generated after the thumbnail and screennail images 606 and 608 are generated using a background spooling process 618. In an alternative embodiment, the thumbnail image 606 and the screennail 608 may be generated by the background spooling process 618 along with the compressed image data 604.

In another preferred embodiment, the thumbnail image 606 and the screennail 608 may be generated using a two-stage live view generator 612. In the first stage, the live view generator 612 provides images to the frame buffer 536 for display as described above. When the user captures an image, the raw image data from the imaging device is compressed due to higher quality before being stored in the input buffers 538, and the live view generator 612 switches to the second stage. In this stage, the live view generator 612 decompresses the compressed raw image data and processes the data into both YCC 222 data and YCC 422 data. The live view generator 612 may then transfer the YCC 422 data to the frame buffer 536 for display, and generate the thumbnail image 606 and the screennail 608 from the YCC 422 data.

The background spooling process 618 preferably includes RAM spoolers 1 and 2 (620), removable memory spoolers 1 and 2 (624), and an image processing and compression process (IPC) 622. Processes 620, 622 and 624 are preferably implemented as background processes on CPU 344 and may therefore run in parallel with other processes. As used herein, a spooler is a process that transfers data from one process or device to a second process or device. The primary purpose of the background spooling process 618 is to move data out of the input buffers 538 as fast as possible in order to free the input buffers 538 to capture another image. After the data is moved, the data is processed in the background. This allows the next image to be captured before the previous image is processed and compressed, which increases the capture rate of the digital camera.

In operation, after the user has captured an image, control of the raw image data in the input buffers 538 is transferred to RAM spooler 1 (620) if the RAM disk 532 is not full. If the RAM spooler 1 (620) obtains control of the raw image data, then the RAM spooler 1 (620) transfers the raw image data to the RAM disk 532. Alternatively, if the RAM disk 532 is full, then control of the raw image data is transferred to the IPC 622 where the data is processed and compressed to generate the compressed image data 604 (FIG. 5).

In the case where the raw image data has been transferred to the RAM disk 532, the removable memory spooler 1 (624) may then access the raw image data from the RAM disk 532 and transfer it to the removable memory 354. Once the raw image data is transferred to the removable memory 354, the IPC 622 accesses the raw image data and processes the raw image data to generate the compressed image data 604. Alternatively, if the removable memory 354 is full or is not present, then the removable memory spooler 1 (624) may provide the raw image data directly to the IPC 622 for generation of the compressed image data 604.

After the compressed image data 604 is generated, the IPC 622 may provide the compressed image data 604 to the RAM spooler 2 (620). The compressed image data 604 is then combined with the thumbnail 606 and the screennail 608 to generate the enhanced image data file (FIG. 5), and the RAM spooler 2 (620) transfers the compressed image data file 600 to the RAM disk 532. Once the image data file 600 is written to RAM disk 532, the removable memory spooler 2 (624) may then access the image data file 600 and write the image data file 600 onto the removable memory 354. If the removable memory 354 is not inserted, the image data file 600 remains on the RAM disk 532. It should be noted that in an alternative embodiment, the digital camera may be implemented without a RAM disk 532, in which case the image data would be spooled to and from the removable memory 354.

Because image data is moved between different components during background spooling, the computer 118 has a mechanism for keeping track of and accessing the image data. For example, in review mode, the digital camera 110 may be required to display the thumbnail image 606 of a particular image on the LCD screen 402. Similarly, in play mode, the screennail image 608 of a particular image may be required for display on the LCD screen 402. Processing of the image may, however, be incomplete when the digital camera 110 is required to display the image on the LCD screen 402. As a result, the computer 118 must be capable of accessing the image at any point during processing.

Figure 7:
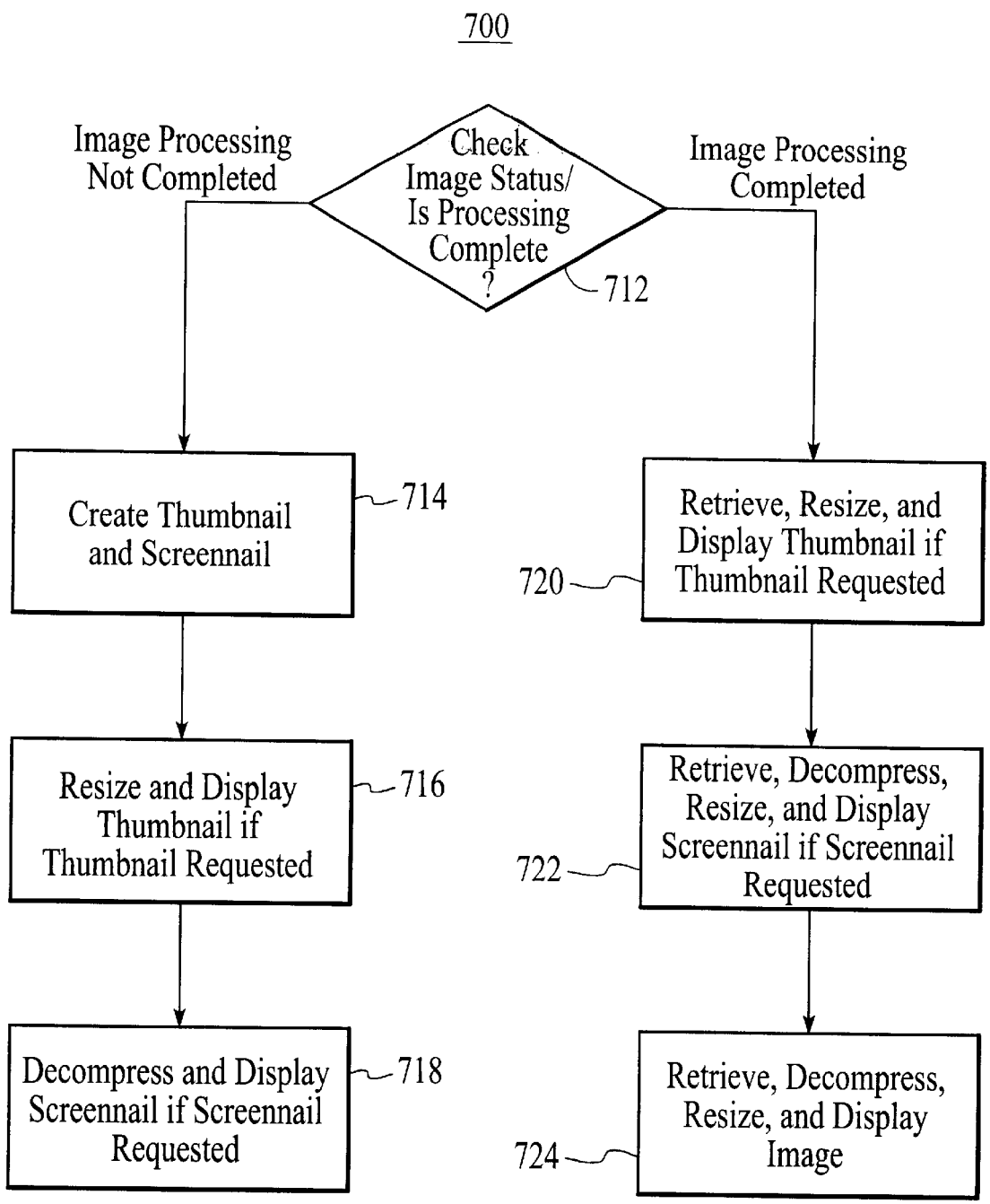
FIG. 7 is a flow chart illustrating one embodiment of the process for determining the status of an image.

FIG. 7 depicts a flow chart of a method 700 for accessing the image for various purposes, such as use in review or play mode, at any time during or after the image data is processed. First, the status of the image is determined via step 712. In one embodiment, determining the status of the image includes not only how far along in processing the image is, but also where the image is located. For example, when the image data is spooled as discussed above, the image may be unprocessed and in the input buffer 538, unprocessed and in the RAM disk 532, or processed and in the RAM disk 532. If image processing is complete, creation of the thumbnail image 606 and screennail image 608 is already completed. In an embodiment where the thumbnail image 606 and screennail image 608 are generated from data in the frame buffer 536, the processing may be considered to be complete because the thumbnail image 606 and screennail image 608 are available.

If the thumbnail image 606 and screennail image 608 are completed, then the image data requested is accessed. If a thumbnail image 606 was requested, for example for use in review mode, the thumbnail image 606 is retrieved and resized via step 720. If the screennail 608 was requested, for example for use in play mode, then via step 722, the screennail 608 is retrieved, decompressed, and resized. Either the thumbnail image 606 or the screennail 608 are then displayed on the LCD screen 402. The last image may also be retrieved once processing of the image is complete. If the full image is required for display, the image is decompressed, resized, and displayed via step 724. As a result, the digital camera 110 can provide a high resolution update of the screennail 608 displayed on the LCD screen 402.

If processing of the image is not complete, then the thumbnail image 606 and screennail 608 are generated via 714. If the thumbnail image 606 was requested, then the thumbnail image 606 is resized and displayed via step 716. Similarly, if the screennail is requested, the screennail 608 is decompressed and displayed via step 718. Consequently, the user can view the image even though processing is incomplete.

Figure 8:
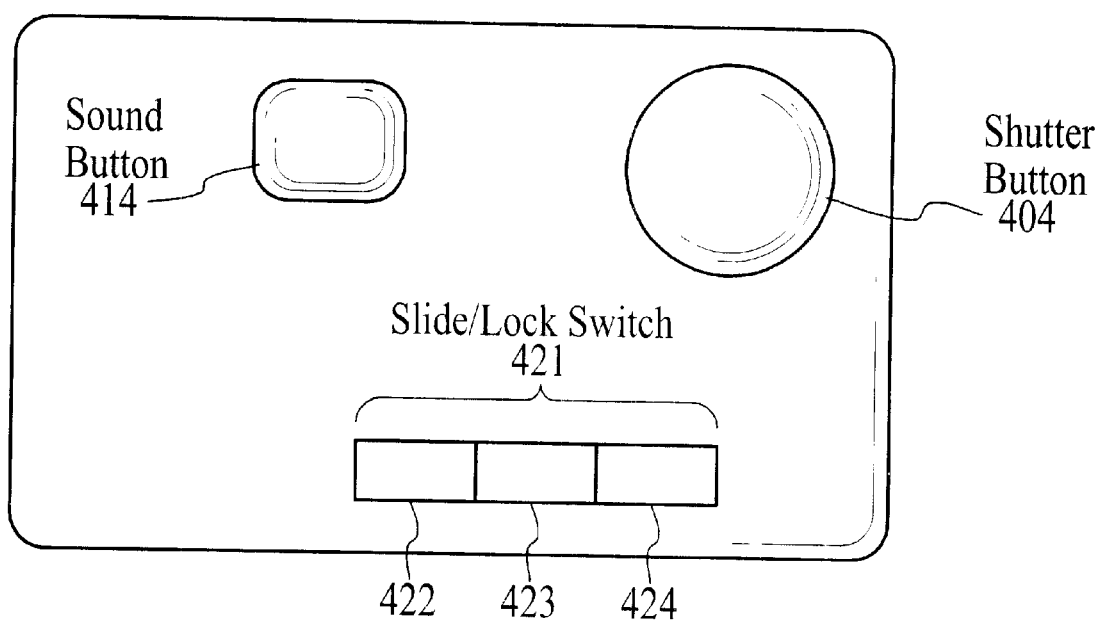
FIG. 8 is a diagram depicting the top view of one embodiment of a digital camera.

To further illustrate the method and system in accordance with the present invention, refer now to FIG. 8, depicting the top view 430 of a portion of one embodiment of the digital camera 110 in accordance with the method and system. The camera 110 includes a capture or shutter button 404 and a sound button 414. A user captures an image by depressing the shutter button 404.

The top view 430 also depicts a slide/lock switch 421 for accessing an instant review mode in accordance with the method and system. The switch 421 is shown as having three positions: live 422, instant review 423, and lock 424. When in the live position 422, the digital camera 110 will allow capture of an image by depressing shutter button 404. Because of the spooling of data, described above, image capture appears extremely fast to a user. Thus, when the user depresses the shutter button 404, there is a brief response indicating the image has been captured, such as a flicker, a sound, or a very brief freezing of the image on the LCD screen 402. The camera 110 then quickly returns to live view. Typically, the user need not wait for the image to be processed before the digital camera 110 reverts to live mode. The image is, therefore, not frozen for a relatively long time on the LCD 402, and no "wait" message is required.

When the user pushes the switch 421 into the instant review position 423, the digital camera is placed into instant review mode and the user is given the opportunity to view the last image captured. The camera 110 remains in instant review mode until the user returns the switch 421 to the live position 422. In a preferred embodiment, the switch 421 is a spring loaded switch for which the default position is the live position 422. Thus, the camera 100 remains in instant review mode only as long as the user holds the switch 421 in the instant review position 423. When the user releases the switch 421, the digital camera 110 reverts to live mode. Once the camera 110 returns to live mode, the user can then capture another image. By holding and releasing the switch 421 between the instant review position 423 and the live position 422, the user can toggle between the live view and instant review of the last image captured. While in instant review mode, the user may perform certain operations on the last image captured in addition to viewing the last image captured. For example, the user will be able to add sound to the last image captured through the use of the sound button 414. When the user captures a second image, the second image will be placed on the LCD screen 402 until the user either exits instant review mode by releasing the switch 421 or presses the shutter button 404, as discussed more fully below.

To add sound to an image, a user presses the sound button 414 to begin recording. To finish recording, the user presses the sound button 414 again. In a preferred embodiment, the sound clip can be recorded either before or after the image to be annotated is captured. In addition, a user can add a recorded sound clip to any previously captured image, not just the last image captured.

Figure 9:
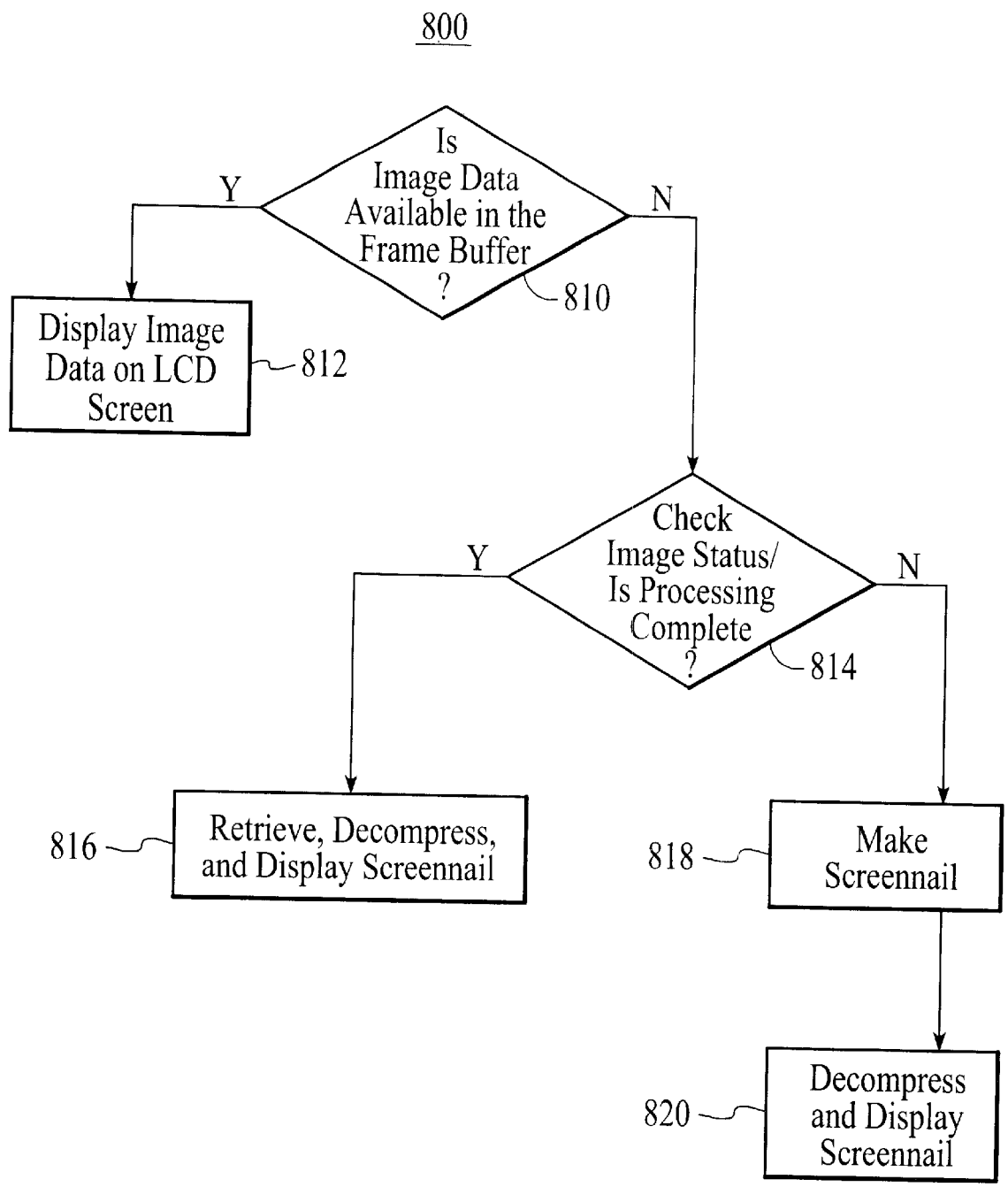
FIG. 9 is a flow chart of one embodiment of a method for providing instant review.

FIG. 9 depicts a method 800 for providing instant review mode in accordance with the method and system. When the switch 421 is placed in the instant review position 423, the method 800 is invoked. First, it is determined if the frame buffer 536 still contains the data for the last image taken via step 810. If the image data is available in the frame buffer 536, then this data is provided to the LCD screen 402 via step 812. In one embodiment, the last image will be retained in the frame buffer 536 until the memory is required. If, however, the image data is no longer in the frame buffer 536, for example because the memory frame buffer 536 was required for other purposes, then the status of the image is determined via step 814. Step 814 of the method 800 is analogous to the step 712 of the method 700.

If the image processing is complete, then the screennail image 608 for the last image is retrieved, decompressed, and displayed via step 816. If the last image was very recently captured and the processing is not complete, then the screennail image 608 is generated via step 818. The screennail image 608 is then decompressed and displayed via step 820. In one embodiment, the thumbnail image 606 and screennail image 608 are created prior to spooling of the image data. As a result, steps 818 and 820 are not required in such an embodiment.

The user can also lock the digital camera 110 into instant review mode by placing the switch 421 in the lock position 424. When the digital camera 110 is first locked in instant review mode, the LCD screen 402 maintains a live view if there is no previously captured image. Otherwise, the last image captured will be placed on the LCD screen 402. The last image captured remains on the LCD screen 402 until the user either exits instant review mode by releasing the switch 421 or by pressing a shutter button 404. A user captures an image by depressing the shutter button 404. In one embodiment, the shutter button 404 has two positions: a first position, where the button is slightly depressed, and a second position where the button 404 is further depressed. Depressing the shutter button 404 to the first position causes a live image to appear on the LCD screen 402, allowing the LCD screen 402 to be used as a viewfinder. Depressing the shutter button 404 to the second position causes an image to be captured.

When the user pushes the shutter button 404 to the second position, the camera 110 provides a response indicating the image has been captured. Because of the spooling of the image data, the image is not frozen on the LCD screen 402 during image processing. Instead, the camera 110 provides a brief response indicating the image has been captured. Instant review mode then causes the image to be placed on the LCD screen 402. In this case, instant review mode is provided using a method similar to the method 800 of FIG. 9. However, because the image was just captured, the image data should still be in the frame buffer 536. As a result, this data is generally displayed on the LCD screen 402.

In order to return to a live view, the user releases the shutter button then presses the shutter button 404 into the first position. As a result, the last image is removed from the LCD screen 402 and replaced with a live view. In one embodiment, if the user then releases the shutter button, the last image is not placed on the screen again. However, in another embodiment, when the user releases the shutter button 404 from the first position, the last image is again displayed on the LCD screen 402. If available, the image data from the frame buffer 536 is used to display the image. If, however, the data was removed from the frame buffer, then the screennail image 608 from the last image is used. Thus, steps 814 through 820 of the method 800 would employed.

In one embodiment, if the digital camera 110 retains this image on the LCD screen 402 for a long enough interval, the digital camera 110 will update the screennail image 608 using the full resolution image. In such a case, the digital camera 110 would also retrieve, decompress and display the corresponding compressed image data 602. While in instant review mode, the user can perform operations on the image being reviewed, such as annotating the image with sound, as in the review and play modes.

In order to be able to capture another image, the user again depresses the shutter button 404 to the second position. When the user captures the second image, the second image will be placed on the LCD screen 402 until the user again releases and presses the shutter button 404 into the first position. In order to exit instant review mode, the user simply moves the switch 421 from the lock position 424 to the live position 422.

Although the instant review mode is described as being accessed through a switch 421, nothing prevents instant review mode from being accessed in another fashion. In another embodiment, instant review mode may be accessed through software, for example by choosing an appropriate icon displayed on the LCD 402. In such an embodiment, however, switching between live mode and instant review mode may be made more difficult by the numbers of commands through which a user may need to scroll to access the instant review mode icon. In addition, in an embodiment in which the user accesses instant review mode through software, once a user leaves instant review mode through the software command, the last image may not be recalled onto the screen by switching back to instant review mode. Although the embodiment discussed above retains the last image on the LCD screen 402 until the shutter button 404 is released and pressed into a first position, nothing prevents the removal of the last image for another reason. For example, in an alternate embodiment, the last image may be retained on the LCD screen for a given time interval. Finally, although reference is made to an instant review mode, the mode provides rapid review of the last image captured.

A method and system have been disclosed for providing an instant review mode in a digital camera. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing instant review of a last image captured by an image capture device, the image capture device including a viewfinder for displaying a live image and each image of a plurality of captured images, and a buffer for storing an image for display on the viewfinder, wherein the image capture device further includes an image processing system, wherein the image processing system further provides a plurality of screennail images corresponding to the plurality of images, the method comprising the steps of:

(a) allowing a user to select instant review of a last image captured by the image capture device;
   (b) determining a status and location of the last image; and and wherein step (b) further comprises the step of:
      (b1) determining if the last image is stored in the buffer; and
      (b2) checking a status of the last image in the image processing system if the last image is not stored in the buffer, and wherein step (b2) further comprises the step of:
         (b2i) determining if the screennail image corresponding to the last image has been generated;
   (c) providing the last image to the viewfinder for display to allow the last image to be edited before image processing for the last image is completed, wherein editing includes allowing a user to add supplemental data to the image;
   wherein the image capture device is capable of displaying the last image substantially immediately after the last image has been captured; and wherein step (c) further comprises the steps of:
      (c1) providing the last image from the buffer to the viewfinder if the last image is stored in the buffer;
      (c2) retrieving and resizing the screennail image and providing the screennail image to the viewfinder if the screennail image corresponding to the last image has been generated.

2. The method of claim 1 wherein step (c2) further comprises the steps of:

(c2i) creating the screennail image if the screennail image has not been generated.

3. The method of claim 2 wherein step (a) further comprises the step of:
(a1) providing a switch for allowing the user to access the instant review mode.

4. The method of claim 3 wherein step the switch further comprises a locked position, the locked position for locking the image capture device in the instant review mode, wherein the image capture device further includes a shutter button, and wherein step (a1) further comprises the step of:
(a1i) allowing the user to place the switch in the locked position; and wherein step (a) further comprises the step of:
(a2) allowing the user to depress the shutter button to capture a next image, wherein the next image becomes the last image.

5. The method of claim 4 wherein the shutter button further includes a first position and a second position, the second position for capturing an image, where step (a2) further comprises the step of:
(a2) allowing the user to depress the shutter button to the second position to capture the last image; the method further comprising the step of:
(d) removing the last image from the viewfinder if the shutter button is released and depressed into the first position after capture of the last image.

6. The method of claim 5 further comprising the step of:
(e) providing the last image to the viewfinder if the shutter button is again released from the first position.

7. The method of claim 6 wherein the image capture device is a digital camera.

8. The method of claim 4 further comprising the step of:
(d) removing the last image from the viewfinder when a predetermined time interval has elapsed.

9. The method of claim 2 wherein step (a) further comprises the step of:
(a1) accessing an instant review mode via an icon displayed on the viewfinder.

10. A method for providing instant review of a last image captured by an image capture device, the image capture device including a viewfinder for displaying a live image and each image of a plurality of captured images, wherein the image capture device further includes an image processing system for processing each of the plurality of previously captured images, wherein the image processing system further provides a plurality of screennail images corresponding to the plurality of images, the method comprising the steps of:
(a) allowing a user to select instant review of a last image captured by the image capture device;
(b) determining a status and location of the last image, wherein step (b) further comprises the step of:
(b1) determining if a particular screennail image has been generated;
(c) providing the last image to the viewfinder for display to allow the last image to be edited before image processing for the last image is completed, wherein editing includes allowing a user to add supplemental data to the image; and
(d) allowing a user to access a play mode and a review mode while the last image captured undergoes processing by the image processing system, and wherein step (d) further comprises the step of:
(d1) retrieving, resizing, and providing the particular screennail image to the viewfinder if play mode has been accessed;

wherein the image capture device is capable of displaying the last image substantially immediately after the last image has been captured.

11. The method of claim 10 wherein the image processing system further provides a plurality of thumbnail images corresponding to the plurality of previously captured images, wherein step (b) further comprises the step of:
(b2) determining whether a portion of the plurality of thumbnail images have been generated; and wherein step (d) further comprises the step of:
(d2) retrieving, resizing, and providing the portion of the plurality of thumbnail images to the viewfinder if review mode has been accessed.

12. The method of claim 11 wherein step (d1) further comprises the steps of:
(d1i) creating the screennail image if the screennail image has not been generated.

13. The method of claim 12 wherein step (d2) further comprises the steps of:
(d1i) creating the portion of the plurality of thumbnail images if a thumbnail image of the portion of the plurality of thumbnail images has not been generated.

14. The method of claim 13 wherein the image capture device is a digital camera.

15. An image capture device for providing instant review of a last image captured by the image capture device comprising:
a viewfinder for displaying a live image and each image of a plurality of previously captured images;
selection means coupled with the viewfinder for selecting instant review of the last image captured by the image capture device;
means coupled to the selection means for determining the status and location of the last image, wherein the determining means further comprise:
buffer determining means for determining if the last image is stored in a buffer;
means for checking a status of the last image in the image processing system if the last image is not stored in the buffer;
screennail determining means for determining if a screennail image has been generated; and
means coupled to the determining means for providing the last image to the viewfinder for display to allow the last image to be edited before image processing for the last image is completed, wherein editing includes allowing a user to add supplemental data to the image, and wherein the last image providing means further comprise:
means coupled to the buffer for providing the last image from the buffer to the viewfinder if the last image is stored in the buffer;
means for retrieving, decompressing, and resizing the screennail image if the screennail image has been generated; and
means coupled to the retrieving means for providing the screennail image to the viewfinder; and
the buffer coupled to the viewfinder for storing an image for display on the viewfinder;
an image processing system coupled to the viewfinder for providing a plurality of screennail images corresponding to the plurality of images;
wherein the image capture device is capable of displaying the last image substantially immediately after the last image has been captured.

16. The image capture device of claim 15 wherein the last image providing means further comprise:

means coupled to the means for providing the screennail to the viewfinder for creating the screennail corresponding if the screennail image has not been generated.

17. The image capture device of claim 16, wherein the selection means further comprise:

a switch for accessing an instant review mode.

18. The image capture device of claim 17 wherein the switch further comprises:

a locked position, the locked position for locking the image capture device in the instant review mode; the image capture device further comprising:
a shutter button coupled to the switch for capturing an image and activating the instant review mode.

19. The image capture device of claim 18 wherein the shutter button further comprises: a first position and a second position, the second position for capturing an image; and wherein the image capture device further comprises:

means coupled to the viewfinder for removing the last image from the viewfinder if the shutter button is released and depressed into the first position.

20. The image capture device of claim 19 further comprising:

means coupled to the shutter button for providing the last image to the viewfinder it the shutter button is released from the first position.

21. The image capture device of claim 18 further comprising:

means coupled to the viewfinder for removing the last image from the viewfinder when a predetermined time interval has elapsed.

22. The image capture device of claim 18 wherein the selection means further comprise:

means for accessing an instant review mode via an icon displayed on the viewfinder.

23. The image capture device of claim 22 wherein the viewfinder further comprises a LCD screen.

24. The image capture device of claim 23 further comprising:

means for annotating the last image captured.

25. The image capture device of claim 24 wherein the annotating means further comprise:

means for adding sound to the last image captured.

26. The image capture device of claim 25 wherein the image capture device is a digital camera.

27. An image capture device for providing instant review of a last image captured by the image capture device comprising:

a viewfinder for displaying a live image and each image of a plurality of previously captured images;

selection means coupled with the viewfinder for selecting instant review of the last image captured by the image capture device;

means coupled to the selection means for determining the status and location of the last image; and means coupled to the determining means for providing the last image to the viewfinder for display to allow the last image to be edited before image processing for the last image is completed, wherein editing includes allowing a user to add supplemental data to the image;

an image processing system for processing each of the plurality of previously captured images, the image processing system allowing a user to access a play mode and a review mode while the last image captured undergoes processing by the image processing system;

wherein the image processing system further provides a plurality of screennail images corresponding to the plurality of images, wherein the status and location determining means further comprise:
means for determining if a particular screennail image has been generated; the system further comprising:
means for retrieving, resizing, and providing the particular screennail image to the viewfinder if the play mode has been accessed; and wherein the image capture device is capable of displaying the last image substantially immediately after the last image has been captured.

28. The system of claim 27 wherein the image processing system further provides a plurality of thumbnail images corresponding to the plurality of previously captured images, the status and location determining means further comprise:

means for determining whether a portion of the plurality of thumbnail images have been generated; and the system further comprising:
means for retrieving, resizing, and providing the portion of the plurality of thumbnail images to the viewfinder if review mode has been accessed.

29. The system of claim 28 wherein the screennail retrieving means further comprise:

means for creating the screennail image if the screennail image has not been generated.

30. The system of claim 29 wherein the thumbnail retrieving means further comprise:

means for creating the portion of the plurality of thumbnail images if a thumbnail image of the potion of the plurality of thumbnail images has not been generated.

31. The system of claim 30 wherein the image capture device is a digital camera.

* * * * *